May 7, 1946.    W. H. WEBER    2,400,035
CARBURETOR ACCELERATING PUMP
Original Filed March 13, 1942
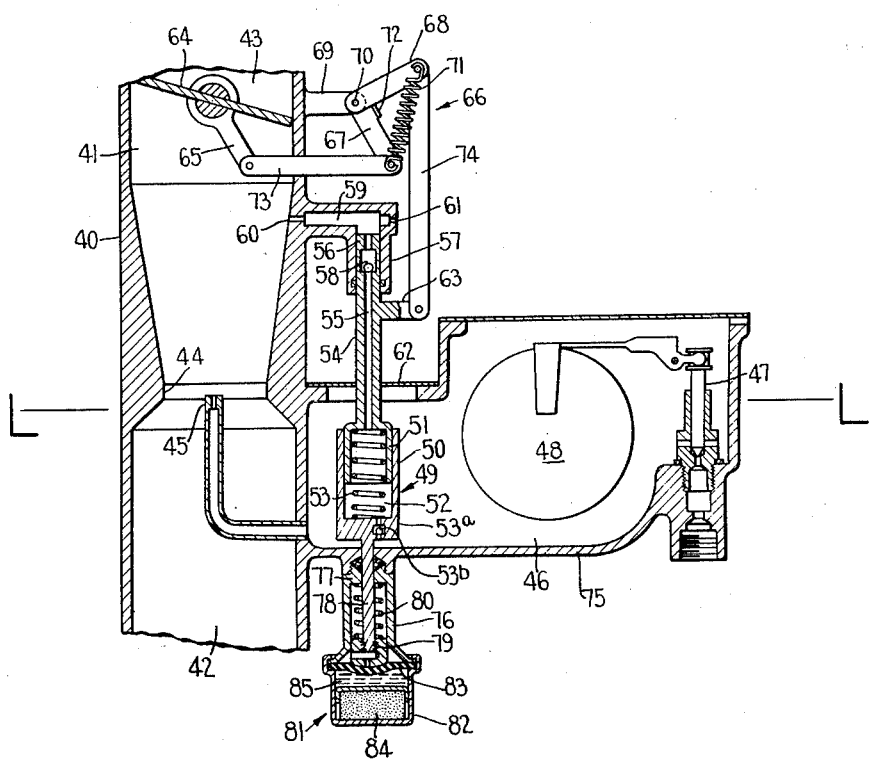
INVENTOR
Walter H. Weber
BY
Andrew K. Foulds
his ATTORNEY Patented Mar. 16, 1943

2,314,035

UNITED STATES PATENT OFFICE 2,314,035

TURF SPIKING MACHINE

Emanuel C. Dontje, Kalamazoo, Mich.

Application April 7, 1941, Serial No. 387,192

13 Claims. (Cl. 97—52)

This invention relates to improvements in turf spiking machines.

The main objects of my invention are:

First, to provide an improved turf spiking, disking, or cultivating machine for agitating the roots of grass surfaces so as to aerate the soil, admit water and facilitate the action of chemical and fertilizers, and thereby promote the growth of the turf of golfing greens and the like, for example, and prevent the occurrence of brown patch and similar afflictions.

Second, to provide a machine of the type described characterized by its ease of manipulation in spiking the desired surface and by the comparative lightness in weight thereof.

Third, to provide a machine of the foregoing character in which the spiking can be regulated as to the spacing of the spiked openings in the turf and in which the spiking is accomplished without unduly tearing or otherwise disturbing the turf.

Fourth, to provide a machine of the foregoing character having provision for positively translating the same over the surface to be spiked without marring, tearing or otherwise defacing the surface.

Further objects pertaining to details and economies of construction and operation of the invention will definitely appear from the description to follow. The invention is defined in the claims.

A structure embodying the features of my invention is clearly illustrated in the accompanying drawings, in which:

Fig. 1 is a view in side elevation of the machine of my invention showing the elements in solid lines in operative spiking position thereof and in dotted lines in position for transportation.

Fig. 2 is a fragmentary top plan view with the prime mover and other instrumentalities removed and partially broken away and in horizontal section to more clearly illustrate details of arrangement of the spiking drums.

Fig. 3 is an enlarged fragmentary view in vertical section illustrating the detail of the mounting of a spike on the drum in the preferred embodiment.

Fig. 4 is a view in section on line 4—4 of Figs. 2 and 6 illustrating the construction of one of the spiking drums, the same being equipped with but a single spike in this figure.

Fig. 5 is a view in section on line 5—5 of Fig. 6 illustrating the construction of an overrunning, one-way driving clutch assembly constituting a part of the invention.

Fig. 6 is an enlarged fragmentary view in vertical section illustrating details of construction and arrangement of the aforesaid clutch assembly.

Fig. 7 is an enlarged fragmentary view in section on a line corresponding to line 7—7 of Fig. 1, illustrating a one-way overrunning drive or clutch arrangement for the driving wheel of the apparatus.

Fig. 8 is an enlarged fragmentary view in section generally similar to Fig. 3 illustrating a modified or alternative form of mounting for a spike or spiking tooth on the drum.

Figs. 9 and 10 are fragmentary sectional views illustrating the action of the spiking blades used in the apparatus of the present invention, the respective views indicating diagrammatically the action of the blades of different size and length.

This invention relates in general to a grass or turf spiking machine or device for the agitation, aeration and general cultivation of the soil or the roots of turf, especially of putting greens and the like, whereby to prevent and inhibit the spread of certain diseases to which such turf is subject, by aerating the roots thereof and admitting water and fertilizer or chemicals used in the treatment of such afflictions or to promote a healthy growth.

In my Patent No. 2,229,497 of January 21, 1941, I illustrate and describe a machine or apparatus for this general purpose, and the present machine incorporates various refinements and improvements over that machine from the standpoints of simplicity of structure, compactness, and ease and effectiveness in manipulation.

In the drawings, the reference numeral 1 indicates in general the spiking machine of this invention which has a relatively strong yet light and compact frame end members 2 of ribbed cast iron including laterally spaced bearing or journal bosses 3 which rotatably receive the drum supporting and journaling shaft 4 and the pairs of arms 5, 6, 7 integral with and radiating from the members 3. The respective arms 5, 6 are joined at their outer ends by integral braces 8 and the arms 6, 7 are connected by a relatively strong rigid bed or support 9 so as to constitute the frame an exceedingly rigid, rugged and distortion-resistant one, notwithstanding its comparative lightness in weight and inexpensiveness.

At the apex of the rearwardly extending radial arms 5 and the brace 8, the same are provided with integral journal bearings 10 which journal a rotatable drive shaft 11. Shaft 11 is driven from the drum shaft 4 through the agency of a chain or link belt 12 which passes around sprockets 13, 14 secured on the drum shaft 4 and drive shaft 11, respectively. The latter is likewise provided with a pair of driving clutch elements 15 of the type illustrated in Fig. 7, the clutch elements being fixed to shaft 11 and serving to positively rotate the carriage drive wheels 16 for advancing or translating the apparatus over the turf.

Each of these wheels includes a hub 17 having flanged annular disk members 18 riveted thereto, which latter members are provided on their outer periphery with pneumatic or solid rubber traction members or tires 19. The hub members 17 are provided on the inner sides thereof with a plurality of angularly spaced cylindrical recesses 20 extending parallel to the axis of drive shaft 11 and slidably receiving the cylindrical clutch pins 21 which are spring urged outwardly in the recesses by coil springs 22. The driving clutch member 15 is secured to drive shaft 11 by a set-screw 23 and is provided on its outer side with the side recesses 24 for coaction with the clutch pins 21. Each of these recesses includes an end abutment or jaw 25 and a gradually inclined side wall 26 merging into the side of the member 15, it being understood that when shaft 11 and clutch member 15 are in angular driving relation to the clutch pins 21 they engage the latter to rotate the wheels 16, whereas, when the reverse is true and the wheel is being rotated by the carriage at a speed greater than the annular speed of shaft 11, then the wheel advances relative to the driving clutch 15, the pins 21 being depressed axially as they travel up the inclined walls 25 of the clutch members. This constitutes an overrunning one-way drive arrangement of great simplicity and little cost, yet entirely satisfactory and effective in its intended operation. The power for rotation of shaft 11 is supplied in the manner to be described.

As stated, the drum shaft 4 is rotatably journaled in laterally spaced bearings or journals 3 of frame 2. A plurality of pairs of spiking drums 27 are rotatably arranged on shaft 4 in the axially spaced relation illustrated in Fig. 2. Each of these pairs have interposed between the individual drums thereof a disk-like, overrunning clutch member 28 of the type illustrated in Figs. 2, 5 and 6, the clutch members being rotatively fixed to shaft 4 by keys 29. Accordingly, the drums of each pair are driven by the respective clutch members 28, or advanced angularly relative thereto for overrunning operation, as when the apparatus is being turned.

The clutch assembly for the driving of the several drums 28 is generally similar to the driving clutch arrangement for the drive wheels 16 in that each clutch member has on its opposite surfaces a plurality of recesses 30 including an arcuate end abutment 31 and an inclined side wall 32 merging with the side surface of the clutch disk member 28. The drums 27 have enlarged hub portions 32 provided on the internal sides thereof with cylindrical recesses 33 receiving cylindrical pins 34 which are urged outwardly by the coil springs 35 for coaction with the clutch member recesses 30 in a manner identical to the operation of the coacting driving wheel hub 17 and driving clutch member 15. The simplicity of this arrangement permits the weight of the individual drums 27 to be held at a minimum thereby greatly facilitating the ease of manipulating the apparatus as a whole.

Rotation of shaft 4, hence the various clutch members 28 keyed thereto, is effected by means of a flexible drive link belt or chain 36 trained around a sprocket 39 which is fixed to shaft 4, this chain or link belt 36 being likewise trained about a similar sprocket (not shown) on the shaft of the prime mover 37. The prime mover in the illustrated embodiment of Fig. 1 is a relatively inexpensive light weight gasoline engine. Rotation is transmitted from drum shaft 4 to wheel drive shaft 11 through the chain or link belt 12, as described above, so that it will be evident that both the drive wheel 16 and the spiking drums 27 are positively rotated together. These are of approximately the same diameter so that a very effective tractive action is obtained without any slipping or skidding of the wheels or drums such as would mar the turf.

The apparatus is guided by the rearwardly extending handle members 38 suitably bolted to the frame and connected at their outer ends by the transverse handle 381. A control rod 40 for governing the speed of the engine 37 extends rearwardly to a point convenient to the handle.

Each of the drums is provided with a plurality of radial bosses 41 around its periphery, the outer surface of the drum being drilled in radial alinement with these bosses to provide the radial bores 42 for the reception of the spikes 43 which have cylindrical body members or adapters 44 fitting into bores 42. The spikes are held in place by screws 431 engaging the drum and fitting in small indentations in the radially outermost surface of the said body members 44 to hold the same in place in the proper alinement of the spikes. These latter are sharpened and bladelike in configuration, having the rear edge 45 disposed radially of the drum periphery and the front or advance edge 46 thereof sharpened and inclined relative to the rear edge and terminating in a point. I find this particular spike construction minimizes objectionable tearing of the turf as the spike is withdrawn upon forward movement of the drum, at the same time permitting desired orbital action of the spike beneath the surface of the turf (as illustrated in Fig. 1) to adequately stir up and aerate the soil and roots.

The spikes 43 may vary in length and also in shape so long as the aforesaid feature of rearwardly inclining the front edge thereof is employed.

In Figs. 9 and 10 I have attempted to illustrate the manner in which the foregoing spike structure minimizes tearing of the turf upon withdrawal of the spikes as the spiking drums are advanced. In Fig. 9 where a relatively short spike 43 is shown, it will be appreciated that the extent of penetration of the spike is correspondingly small, yet even so there is a definite tendency to lift and tear the turf at the rear of the incision in the ground, were the front edge 46 of the spike not rearwardly inclined to minimize the same. Successive positions of the spike are indicated in dotted lines in Fig. 9 to illustrate the fact that a substantial stirring of the sod and the roots therein takes place. In Fig. 10 the relatively elongated blade 431 is shown at the point where it enters the turf. Successive positions of the spike as its free end travels through the sod are shown in dotted lines. A blade of this length would definitely rip the turn at the rear of the incision following its orbital swing therein, but the rearward inclination of edge 461 avoids this, the spike being pulled out without unduly disturbing the rear of the incision. The direction of translation of the machine is indicated by arrows in Figs. 9 and 10.

It will be understood that as the drum rolls forward and presents the successive spikes to the turf the same cut downwardly and through the turf in a combined movement of translation and rotation as the drum axis passes over the spike and incision. Were the shank of the spike cylindrical or parallel sides it can readily be seen that a substantial disturbance of the surface of the turf would take place upon withdrawal of the spike. The severity of the disturbance would depend on the length of the spike. Constructed as described the maximum incision in the turf is approximately equal to the length of the sharpened side of the spike, and the turf is not tossed up at the rear edge of the cut. Only a very slight cut in the turn (in addition to the original incision) is made by the retreating spike. An indication of the minor character of this up-cut can be had by inspecting Figs. 9 and 10.

In Fig. 8 I illustrate a somewhat modified embodiment of a spike mounting wherein the recess 47 is rectangular in cross-section in conformity with the cross section of the spike 48, the latter being slipped into the recess and held therein by a set-screw 49 arranged at an angle and bearing against the surface of the spike. Unused bosses are filled with plugs 49¹.

The operative spiking position of the apparatus is illustrated in solid lines in Fig. 1 and it will be perceived that the weight of the structure is borne in part by driving wheels 16 and in part by the spiking or disking drums 27, the latter resting on the surface and projecting the spikes therein. The number of spikes on each drum may be chosen as circumstances dictate and the weight of the parts is such that, with the maximum number of spikes in each drum, the same are projected in the turf in desired manner. When it is desired to transport the machine to another location, the former is rocked rearwardly on wheels 16, thereby elevating the spikes to the position illustrated in dotted lines in Fig. 1. To facilitate transportation in this position and to hold the spikes out of contact with the soil without the exercise of caution on the part of the operator in this respect, I provide an auxiliary transporting wheel 50 which is mounted on a caster 51 rotatable in an enlargement or boss 52 on a retractable supporting arm 53. This latter is pivoted at 54 in a forwardly extending bracket 55 fixed to the table or support 9, and in inoperative position thereof, i. e., when the apparatus is being employed in spiking, the arm 53 and wheel 50 are swung rearwardly to the position illustrated in solid lines. However, in transporting the machine the said wheel is swung forwardly to the position illustrated in dotted lines coacting with the turf, and in this position a retractable spring urged detent 56 engages a notch 57 on an extension of the pivoted support 53 to hold the same rigidly relative to bracket 55. As illustrated, the driving and transporting wheels 16, 50, respectively, are related in this last named position that the disking drums are elevated and held out of spiking engagement with the turf and the machine may be readily transported wherever desired.

In the foregoing construction the weight of the table and prime mover is supported on the driven wheel drums, the thus distributed weight of the parts being ample to force the spikes into effective penetration of the turf. As stated, the wheels and drums are both positively driven from the engine so that effective traction is had for advancing the machine without the exertion of much effort on the part of the operator, he being concerned primarily with guiding the apparatus. In turning extremely sharp corners the carriage is rocked rearwardly on the driving wheels so as to free the spikes from the turf, and then lowered for reengagement of the spikes therewith when the corner is negotiated. For transportation, the auxiliary transporting wheel 50 is quickly and easily swung to operative position in which in conjunction with the driven wheel 16 it supports the spike drums in an adequately elevated position to avoid interference, either with the turf or any other surface over which the apparatus is translated. In this latter retracted or elevated position of the spiking drums power is still supplied to the driving wheels for engine driven transporting of the apparatus.

The overrunning clutch connections enable practically any curve other than a sharp turn to be negotiated without halting or detracting from the spiking operation or resulting in tearing of the turf. The use of spikes having the forwardly inclined or angled and sharpened rear edges likewise contributes to this end of preventing scarring of the surface, at the same time enabling the effective stirring of the sod and roots. These spikes may be employed in any desired number and are quickly and easily applied to or removed from the drums without likelihood of being improperly oriented, since the spike-receiving and securing means employed admits of only a single manner of alining the spike edges.

I have illustrated and described my invention in embodiments which I have found highly satisfactory and practical. I have not attempted to illustrate further adaptations of which my invention is capable as it is believed the disclosure made will enable the embodiment of my invention as may be desired.

Having thus described my invention what I claim as new and desire to secure by Letters Patent is:

1. A turf spiking or cultivating machine of the type described comprising a carriage frame having means for rotatably supporting parallel spaced drum and wheel driving shafts, a chain drive interconnecting said shafts for rotation together, a pair of wheels rotatably mounted on said wheel shaft and having overrunning clutch means for drivingly connecting same to said wheel shaft for rotation therewith, a plurality of axially spaced drums rotatably mounted on said drum shaft, overrunning clutch means on said drums for drivingly connecting the same to said drum shaft, said drums and wheels being of approximately equal diameter and being rotated by said interconnecting driving means at approximately the same angular speed, said drums each having a plurality of circumferentially alined angularely spaced cultivating elements removably secured thereto in predetermined relation, and engine means supported on said carriage frame drivingly connected to one of said shafts for rotating said wheels and advancing said frame with said elements in penetrating engagement with the surface to be cultivated, said carriage frame having an auxiliary front transporting wheel pivotably mounted thereon which is swingable from inoperative retracted position to operative position engaging said surface, said transporting wheel in operative position being so related to the driving wheels as to maintain said drums in elevated position with the elements thereof out of penetrating engagement with the surface.

2. A turf spiking or cultivating machine of the type described comprising a carriage frame having means for rotatably supporting parallel spaced drum and wheel drive shafts, means drivingly interconnecting said shafts for rotation together, a pair of wheels rotatably mounted on said wheel shaft and having means for drivingly connecting same to said wheel shaft for rotation therewith, a plurality of axially spaced drums rotatably mounted on said drum shaft, overrunning clutch means on said drums for drivingly connecting the same to said drum shaft, said drums and wheels being of approximately equal diameter and being rotated by said interconnecting driving means at approximately the same angular speed, said drums each having a plurality of cultivating elements secured thereto in predetermined relation, and a prime mover on said carriage frame drivingly connected to one of said shafts for rotating said wheels and advancing said frame with said elements in penetrating engagement with the surface to be cultivated, said carriage frame having an auxiliary front transporting wheel pivotally mounted thereon which is swingable from inoperative retracted position to operative position engaging said surface, said transporting wheel in operative position being so related to the driving wheels as to maintain said drums in elevated position with the elements thereof out of penetrating engagement with the surface.

3. A turf spiking or cultivating machine of the type described comprising a carriage frame having means for rotatably supporting parallel spaced drum and wheel driving shafts, means drivingly interconnecting said shafts for rotation together, a pair of wheels rotatably mounted on said wheel shaft and having means for drivingly connecting same to said wheel shaft for rotation therewith, a plurality of drums on said drum shaft, overrunning clutch means for drivingly connecting the same to said drum shaft and to one another to enable rotation thereof relative to one another, said drums and wheels being rotated by said interconnecting driving means at approximately the same angular speed, said drums having a plurality of cultivating elements secured thereto in predetermined relation, and a prime mover on said carriage frame drivingly connected to one of said shafts for rotating said wheels and advancing said frame with said elements in penetrating engagement with the surface to be cultivated, said carriage frame having a transporting wheel retractably mounted thereon which is movable from inoperative position to operative position engaging said surface, said transporting wheel in operative position being so related to the driving wheels as to maintain said drums in elevated position with the elements thereof out of penetrating engagement with the surface.

4. A turf spiking or cultivating machine of the type described comprising a carriage frame having driving wheels and a plurality of drums rotatable thereon on axes spaced laterally from one another, means drivingly interconnecting said wheels and drums for rotation together, including overrunning clutch means connecting said drums to one another for relative rotation, said drums and wheels being rotated by said interconnecting driving means at approximately the same angular speed, said drums having a plurality of cultivating elements secured thereto in predetermined relation, and a prime mover on said carriage frame for rotating said wheels and advancing said frame with said elements in penetrating engagement with the surface to be cultivated, said carriage frame having a transporting wheel retractably mounted thereon which is movable from inoperative position to operative position engaging said surface, said transporting wheel in operative position being so related to the driving wheels as to maintain said drums in elevated position with the elements thereof out of penetrating engagement with the surface.

5. In a cultivating machine of the type described, a support having a pair of parallel laterally spaced shafts, driving wheels rotatable on and drivingly connected to one of said shafts by overrunning clutch means, cultivating drums rotatable on the other shaft and drivingly connected thereto by overrunning clutch means, said support being rockable on said driving wheels to elevate said drums out of operative relation to a surface being cultivated, an auxiliary transporting roller pivotally and retractably mounted on said frame in advance of said drums, said transporting roller being swingable to inoperative position when the drums are in operative engagement with the surface and to operative position engaging the surface when said drums are elevated to inoperative position, means for holding said auxiliary roller in operative position coacting with said driving wheels in sustaining the drums in elevated inoperative position, and means for positively rotating said shafts.

6. In a cultivating machine of the type described, a support, driving wheels rotatable on said support, cultivating drums rotatable on the support on an axis to one side of the wheel axis and drivingly connected to said wheels, said support being rockable on said driving wheels to elevate said drums out of operative relation to a surface being cultivated, an auxiliary transporting roller pivotally mounted on said frame on the opposite side of said drums from said wheel axis, said transporting roller being retractable to inoperative position when the drums are in operative engagement with the surface and to operative position engaging the surface when said drums are elevated to inoperative position, means for holding said auxiliary roller in operative position coacting with said driving wheels in sustaining the drums in elevated inoperative position, and means for positively rotating said drums, including overrunning clutch means drivingly connected to said last named means and the drums enabling rotation of the latter relative to one another.

7. In a cultivating machine of the type described, a support, driving wheels rotatable on said support, cultivating drums rotatable on the support on an axis to one side of the wheel axis, means for rotating said drums, including overrunning clutch means interconnecting the drums with one another for relative rotation, said support being rockable on said driving wheels to elevate said drums out of operative relation to a surface being cultivated, an auxiliary transporting roller retractably mounted on said frame on the side of said drums opposite the wheel axis, said transporting roller being retractable to inoperative position when the drums are in operative engagement with the surface and to operative position engaging the surface when said drums are elevated to inoperative position, and means for holding said auxiliary roller in operative position coacting with said driving wheels in sustaining the drums in elevated inoperative position.

8. In a spiking apparatus of the type described, a frame having a pair of parallel laterally spaced shafts rotatably mounted thereon, means for positively rotating said shafts, driving wheels rotatable on one of said shafts, spike carrying drums rotatable on the other shaft, and overrunning clutch means for drivingly connecting said wheels and drums to the respective shafts, said means comprising disk-like clutch members in angularly fixed relation to the respective shafts and having clutch recesses in the side surface thereof, said recesses each including an end abutment and an inclined side wall of substantial length gradually merging into the side surface of the member, said wheels and drums having laterally opening bores therein, and spring urged pins disposed in said bores and coacting with the clutch recesses of the respective clutch members for engagement with the abutment thereof to drivingly connect the wheels and drums to their respective shafts and to permit overrunning of the wheels and drums when the angular speed thereof exceeds that of the respective shafts.

9. In a spiking apparatus of the type described, a frame having a shaft rotatably mounted thereon, driving wheels rotatable on the frame, means for positively rotating said wheels and shaft, spike carrying drums rotatable on the other shaft, overrunning clutch means for drivingly connecting said drums to said shaft, said means comprising a disk-like clutch member in angularly fixed relation to the shaft and clutch recesses in the side surface thereof, said recesses each including an end abutment and an inclined side wall of substantial length gradually merging into the side surface of the member, said drums having laterally opening bores therein, and spring urged pins disposed in said bores and coacting with the clutch recesses of the clutch member for engagement with the abutment thereof to drivingly connect the drums to said shaft and to permit overrunning of the drums when the angular speed thereof exceeds that of the shaft.

10. In a turf spiking machine of the type described, a frame, a shaft rotatably mounted on said frame, means for positively rotating said shaft, a plurality of pairs of spiking drums rotatable on said shaft, a disk-like clutch member interposed between the drums of each of said pairs in angularly fixed relation to said shaft, and clutch means associated with said drums and coacting with said respective clutch members for overrunning driving engagement of the drums with the respective clutch members, said drums having a plurality of angularly spaced spikes removably secured thereto in circumferential alinement, said spikes being of thin flat cross section with the side edges in planes normal to said shaft, the rear edge of the spike being radial with reference to the drum and the front edge being sharpened and inclined substantially to a point at the outer end to facilitate withdrawal of the spike from the turf without scarring the latter.

11. In a turf spiking machine of the type described, a frame, a plurality of spiking drums rotatable on said frame, means including one-way clutch means for positively driving the drums, said drums having a plurality of angularly spaced spikes removably secured thereto in circumferential alinement, said spikes being of thin flat cross section with the side edges in planes normal to the drum axis, the rear edge of the spike being radial with reference to the drum and the front edge being sharpened and inclined substantially to a point at the outer end to facilitate withdrawal of the spike from the turf without scarring the latter.

12. In a turf spiking machine of the type described, a rotatable spiking drum having a plurality of angularly spaced spikes removably secured thereto in circumferential alinement, said spikes being of thin flat cross section with the side edges in planes normal to the drum axis, the rear edge of the spike being straight, radial with reference to the drum and the front edge being sharpened and inclined substantially to a point at the outer end to facilitate withdrawal of the spike from the turf without scarring the latter.

13. In a turf spiking machine of the type described, a rotatable spiking drum having a plurality of angularly spaced spikes thereon in circumferential alinement, said spikes being of thin flat cross section with the side edges in planes normal to the drum axis, the rear edge of the spike being radial with reference to the drum and the front edge being straight, sharpened and inclined substantially to a point at the outer end to facilitate withdrawal of the spike from the turf without scarring the latter.

EMANUEL C. DONTJE.